(12) United States Patent
Sun et al.

(10) Patent No.: US 8,289,395 B2
(45) Date of Patent: Oct. 16, 2012

(54) ENHANCING IMAGE RESOLUTION BY ROTATION OF IMAGE PLANE

(75) Inventors: Zhaohui Sun, Rochester, NY (US); Majid Rabbani, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1076 days.

(21) Appl. No.: 11/960,890

(22) Filed: Dec. 20, 2007

(65) Prior Publication Data

US 2009/0160941 A1 Jun. 25, 2009

(51) Int. Cl.
*H04N 5/30* (2006.01)

(52) U.S. Cl. ............... 348/162; 348/208.13; 348/208.99

(58) Field of Classification Search .................. 348/162, 348/208.13, 208.99
See application file for complete search history.

(56) References Cited

U.S. PATENT DOCUMENTS

| | | | | |
|---|---|---|---|---|
| 5,926,216 A * | 7/1999 | Nobuoka | | 348/297 |
| 7,420,592 B2 * | 9/2008 | Freeman | | 348/219.1 |
| 2002/0185586 A1 * | 12/2002 | Majewski et al. | | 250/208.1 |
| 2005/0057662 A1 * | 3/2005 | Washisu | | 348/208.99 |
| 2005/0280714 A1 * | 12/2005 | Freeman | | 348/219.1 |
| 2007/0267584 A1 * | 11/2007 | Cherry | | 250/555 |
| 2011/0169960 A1 * | 7/2011 | Wagner | | 348/162 |

* cited by examiner

*Primary Examiner* — Mohamed Wasel
(74) *Attorney, Agent, or Firm* — Thomas J. Strouse; Peyton C. Watkins

(57) ABSTRACT

An imaging apparatus with adjustable imaging plane, the apparatus having mechanical, electronic or optical devices to adjust the position and the orientation of the imaging plane, which successively captures a plurality of images while adjusting the imaging plane, and a method to integrate the captured images to a single high-resolution image by exploration of the mutual information not available in a single image, such as the sub-pixel observations due to the spatial misalignment, thus achieving an image resolution higher than the sensor resolution.

20 Claims, 5 Drawing Sheets

ENHANCING IMAGE RESOLUTION BY ROTATION OF IMAGE PLANE

FIELD OF THE INVENTION

The invention relates generally to the field of digital image and video capturing and processing, and in particular to the spatial resolution enhancement of a digital image or an image sequence.

BACKGROUND OF THE INVENTION

Image resolution enhancement is technically possible by using multiple images of the same scene and exploring the mutual information shared among the images, which is not available in a single image. For example, the spatial misalignment of the normal resolution images, due to spatial sampling on integer lattice, introduces sub-pixel observations from which high frequency components can be estimated. Additional information can also be explored, such as the prior knowledge of a scene and the imaging degradation model. The processed image has a higher spatial resolution and reveals more content details.

Techniques for image resolution enhancement include imaging devices that are capable of displacing an image laterally on the sensor array by insertion of a rotatable disc having parallel-faced portions of different thickness. Other devices use an imaging system with a modulating element that alters incident radiation to displace the image by fractions of a pixel between adjacent fields by either mechanically shifting the elements or by electro-optic variations of refractive index. Yet other devices provide an imaging capture apparatus with a set of primary color filters to increase image resolution. At least one of the filters is capable of shifting the color image beam, therefore introducing sub-pixel translation on imaging plane.

However, the previously referenced device either shift the images on a fixed imaging plane by altering the optical path or do not allow rotating of the imaging plane around x, y, and z axis. Furthermore, there is no elaborations on the sequence of image capture, the warping of images on a common coordinate based on the imaging plane motion, and the technique to explore the sub-pixel observations to achieve resolution enhancement. Therefore, there is a need to devise an imaging apparatus with adjustable imaging plane and a method to integrate the multiple normal resolution observations to a high-resolution image or image sequence.

SUMMARY OF THE INVENTION

In general terms, the present invention relates to spatial resolution enhancement of a digital image or an image sequence.

One aspect of the present invention includes an imaging apparatus with adjustable imaging plane. More particularly, the invention includes a lens for focusing electromagnetic waves on an imaging plane, an array of sensors disposed on the imaging plane, a control unit for capturing a plurality of normal resolution images, a memory for storing the plurality of normal resolution images, a processor for performing computations on the normal resolution images, and means for adjusting the orientations of the imaging plane, and means for integrating the plurality of normal resolution images for creating an image with higher resolution than the sensor resolution.

One aspect of the present invention includes a computational method of enhancing image spatial resolution and frequency content. More particularly, the invention includes deriving a correspondence between captured images based on a relative translation and orientation of an imaging plane, warping all the normal resolution images to a common reference coordinate, and estimating a high-resolution image that yields projections on the imaging plane closest to normal resolution observations.

DETAILED DESCRIPTION OF THE INVENTION

Figure 1:
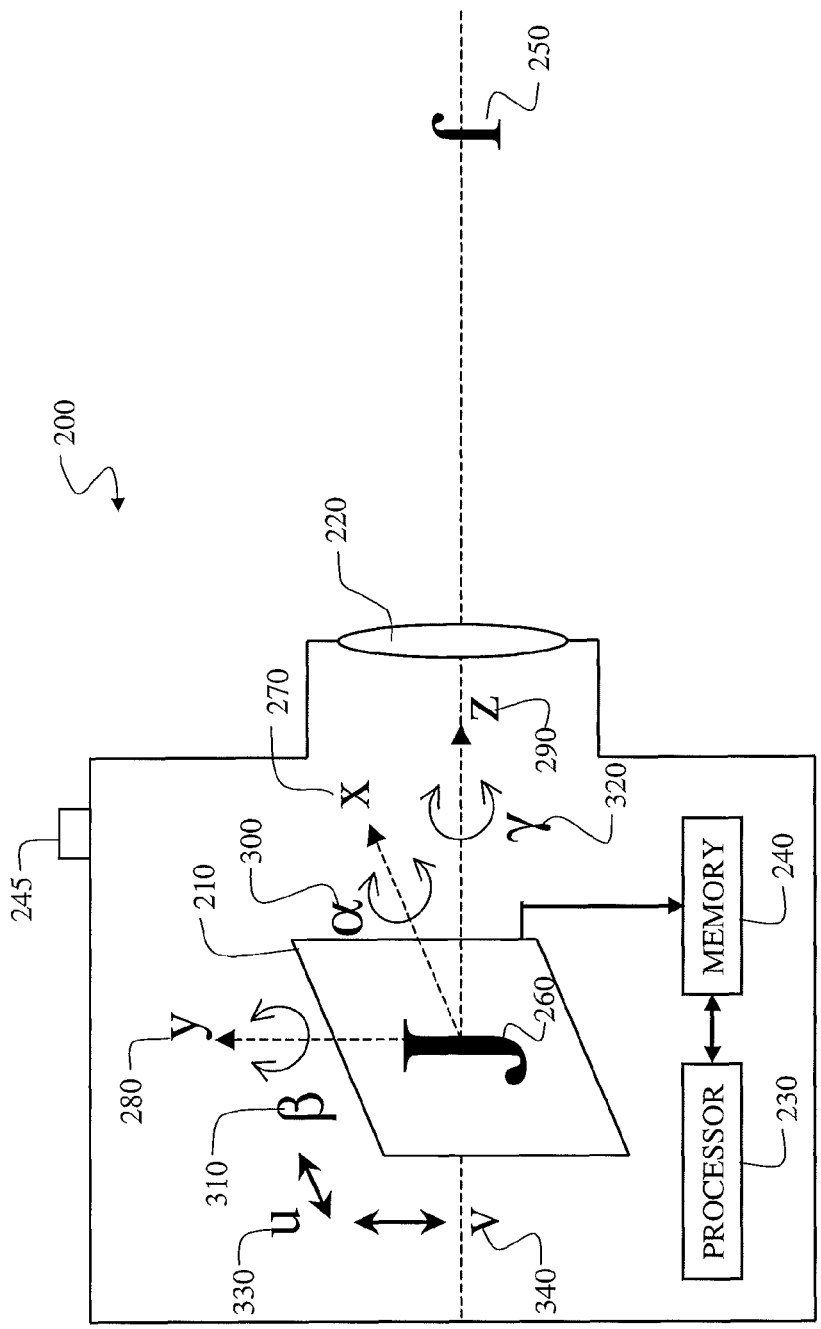
FIG. 1 illustrates an imaging device with an adjustable imaging plane.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In the following description, embodiments of the present invention will be described in terms that would ordinarily be implemented as a hardware apparatus and a software program. However, the invention is not limited to the above configuration and the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

One embodiment is concerned with capturing an image or image sequence at a resolution higher than a sensor resolution. This is accomplished by the use of an imaging apparatus with an adjustable imaging plane and the use of a resolution enhancement technique to combine the multiple images captured at different imaging plane positions and orientations to a high-resolution image or image sequence with enhanced spatial resolution and frequency content. In the following description, an image with the same spatial resolution as the sensor resolution is referred to as a normal resolution image, and an image with a spatial resolution higher than the sensor resolution is referred to as a high-resolution image. Thus, the embodiment provides an imaging apparatus for capturing a plurality of the normal resolution images with the precise control of the position and orientation of the imaging plane and a technique to integrate the normal resolution observations to a high-resolution image or image sequence.

The disclosed invention is intended to overcome the inherent resolution limitation of an imaging system, as dictated by the granularity of a film and the density of a CCD or CMOS array. For example, the physical size of a sensor cannot be made arbitrarily small, as the sensor has to be big enough to receive enough photons to overcome the noise. Therefore, there is a need to capture images at a resolution higher than the sensor resolution. Image resolution enhancement is also necessary due to the various constraints and trades in practical imaging systems.

Still further, as used herein, the computer program may be stored in a computer readable storage medium. For example, the media can be a magnetic storage media such as a magnetic disk (such as a hard drive or a floppy disk) or magnetic tape, optical storage media such as an optical disc, optical tape, or machine readable bar code, solid state electronic storage devices such as random access memory (RAM), or read only memory (ROM), or any other physical device or medium employed to store a computer program.

FIG. 1 illustrates one embodiment of an imaging apparatus 200 with adjustable imaging plane for implementing the present invention. The imaging device 200 includes an imaging plane 210 having an array of sensors, means to shift the imaging plane horizontally and vertically and to rotate around x, y, and z axes, and a lens 220 for focusing electromagnetic waves on the imaging plane. The imaging device also includes a control unit 245 for directing successive capture of a plurality of images while adjusting the position and the orientation of the imaging plane, a microprocessor-based unit 230 for receiving and processing software programs and for performing other processing functions, a memory 240 for storing image data and computational codes, and means to connect and synchronize the operations of the modules. Although the imaging device 200 is shown for the purpose of the embodiment, the present invention is not limited to the apparatus 200 shown, but can be used on any imaging systems.

The sensors on the imaging plane 210 can be, but is not limited to, a silver halide film, a CCD (Charge-Coupled Device) array, or a CMOS (complementary metal-oxide semiconductor) array. The imaging sensors capture the electromagnetic waves by converting them to electronic, chemical or magnetic signals. Instead of being stationary and fixed, the imaging plane in this invention is adjustable, and the adjustment is precisely controlled by mechanical, electrical or optical means. The imaging plane 210 can be shifted along X axis 270 and Y axis 280, yielding a horizontal translation 330 and a vertical translation 340. Translation along Z axis 290 is possible for the zooming effect, if no significant blurring is introduced. It can also be freely rotated along X axis 270, Y axis 280 and Z axis 290, yielding rotation angles of α 300, β 310 and γ 320. As the imaging plane is precisely controlled, its position and orientation are always known.

A memory module 240 provides a media for storing different types of data and computational codes, i.e., the image data recorded on the sensors. The memory module 240 has a capacity large enough to store one or more images. It also provides a means of inputting the software programs and other information to the microprocessor-based unit 230. Parts of the memory may be extracted to external devices.

The microprocessor-based unit 230 may be programmed for storing the software program internally. Various computations are carried out in the processor 230, including the resolution enhancement from multiple exposures.

The control unit 245 directs successive capture of multiple images while the imaging plane is orientated to different positions and orientations. As the capture process starts, a normal resolution image is captured on imaging plane 210 and transferred to the memory module 240. The control unit 245 precisely adjusts the imaging plane to a preprogrammed position and orientation. Another image is taken on the newly adjusted imaging plane. The image data and the translation and rotation of the imaging plane are transferred to and stored in the memory module 240. The imaging plane is adjusted to another position and orientation, and another image is captured. The process continues until a pre-specified number of images have been captured, or the quality of the resolution-enhanced image has reached a satisfactory level. In one embodiment, during the image capture process, the scene and lighting do not change and there is no relative motion between the object 250 and the imaging device 200. However, the invention is not limited to the above configuration and changes in lighting and relative motion can occur during the image-capture process. The object 250 to be imaged resides in a media, such as air, water, or vacuum, and the electromagnetic waves can be visible light, X-ray, or other modalities. Thus, the imaging device 200 can be used in a variety of environment for different applications.

Figure 2D:
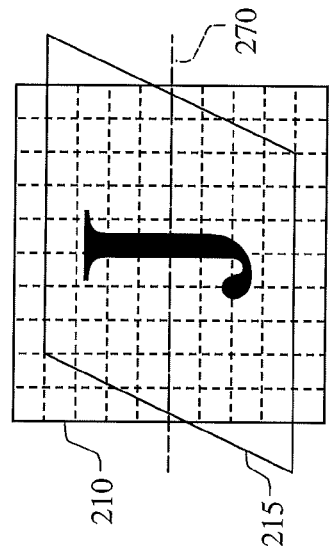
FIGS. 2a, 2b, 2c, and 2d illustrate various configurations of imaging planes.
Figure 2C:
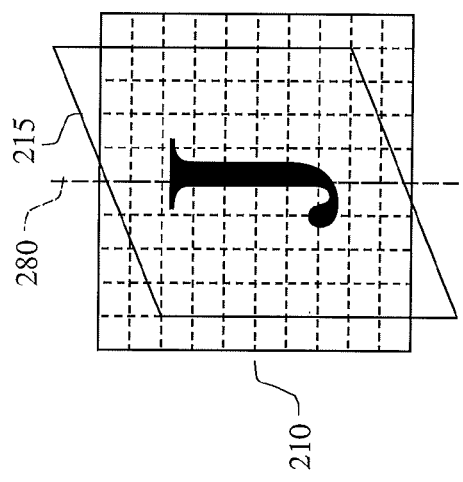
Figure 2B:
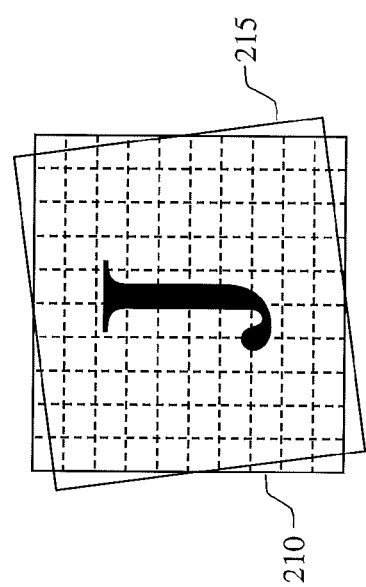
Figure 2A:
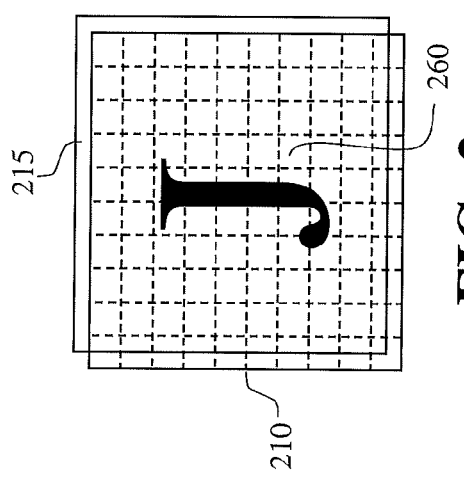

FIGS. 2a-d illustrate various configurations of the imaging planes. After image capturing on imaging plane 210, the imaging plane is moved to a different position and orientation 215. The geometric relationship between the two imaging planes provides sub-pixel observations. In FIG. 2a, imaging plane 210 is shifted horizontally and vertically to imaging plane 215. In FIG. 2b, imaging plane 210 is rotated around z axis. In FIG. 2c, imaging plane 210 is rotated around y axis 280 by a small angle. And in FIG. 2d, imaging plane 210 is rotated around x axis 270 by a small angle.

Given a pixel $x=(x,y,z)^T$ on imaging plane 210, its correspondence $x'=(x',y',z')^T$ on an imaging plane at a different position and orientation can be written as $x'=P_{3\times 3}x^T+(-u,-v,0)^T$, or $$\begin{bmatrix} x' \\ y' \\ z' \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} x \\ y \\ z \end{bmatrix} + \begin{bmatrix} -u \\ -v \\ 0 \end{bmatrix}.$$

The parameters can be uniquely decided given the horizontal and vertical translations of u and v, and the rotation angles α, β and γ as shown in FIG. 1.

The correspondence can be extended to a more general form $$x'=f(x),$$

where function f(*) is known from the control parameters of the imaging device. The ultimate goal of function f(*) is to provide multiple exposures with sub-pixel observations and precise point correspondences, from which an image with higher resolution can be estimated.

Figure 3:
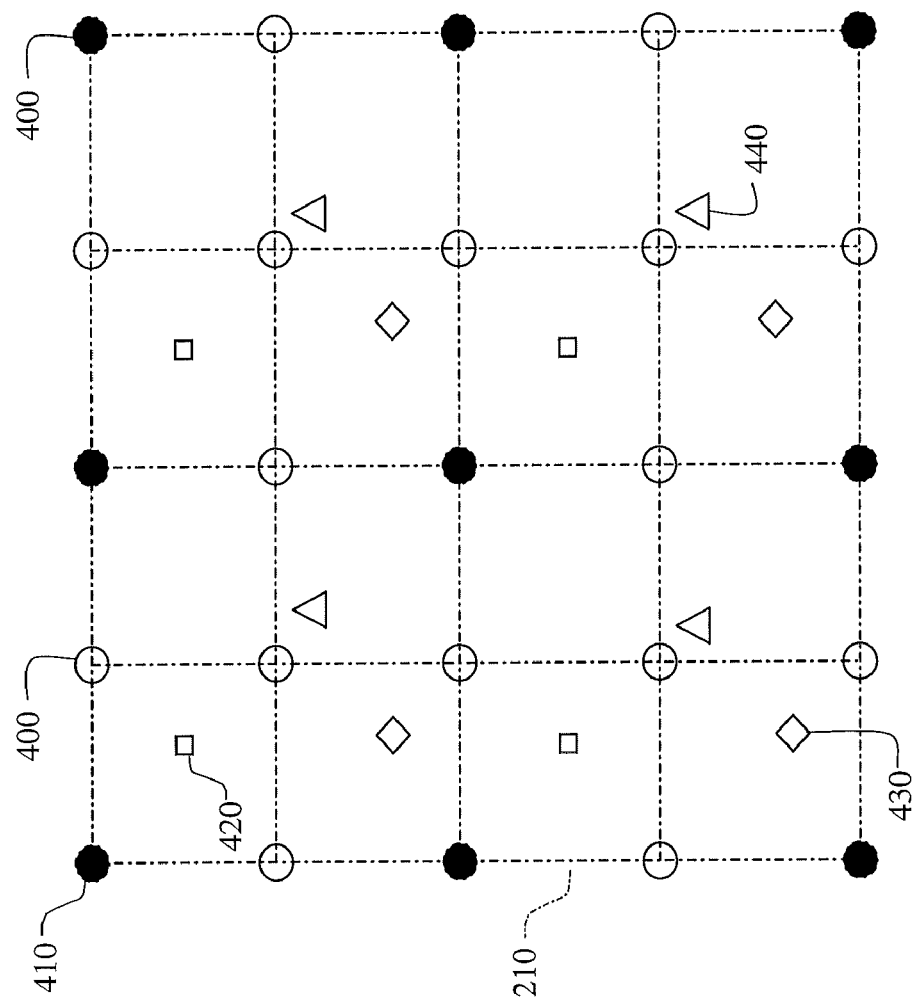
FIG. 3 illustrates an image resolution enhancement from four image exposures.

FIG. 3 illustrates an image resolution enhancement from four image exposures. In this particular embodiment, the imaging sensors capture pixels at every other pixel locations, and the spatial resolution is double in both x and y axes on the lattice grids, yielding an image with spatial resolution 4 times higher than that of the sensor resolution. Under the direction of the control unit 245, the first image is captured with imaging plane at its original location (u=v=0, α=β=γ=0). The pixel locations 410 are marked as bullets, and the coordinate system is chosen as the common coordinate where the high-resolution image resides. Then a second image is grabbed at different imaging plane position and orientation, and the pixel locations 420 (denoted as boxes) are warped to the common coordinate system with known geometric transform f(*). The transform usually maps the pixels from integer locations to non-integer grid locations, as shown in FIG. 3. The process repeats for the third image with pixel locations marked as diamonds 430 and the fourth image with pixel locations marked as triangles 440. By precisely controlling the position and the orientation of the imaging plane, exact point correspondence and sub-pixel observations can be extracted and used for spatial resolution enhancement.

Figure 4:
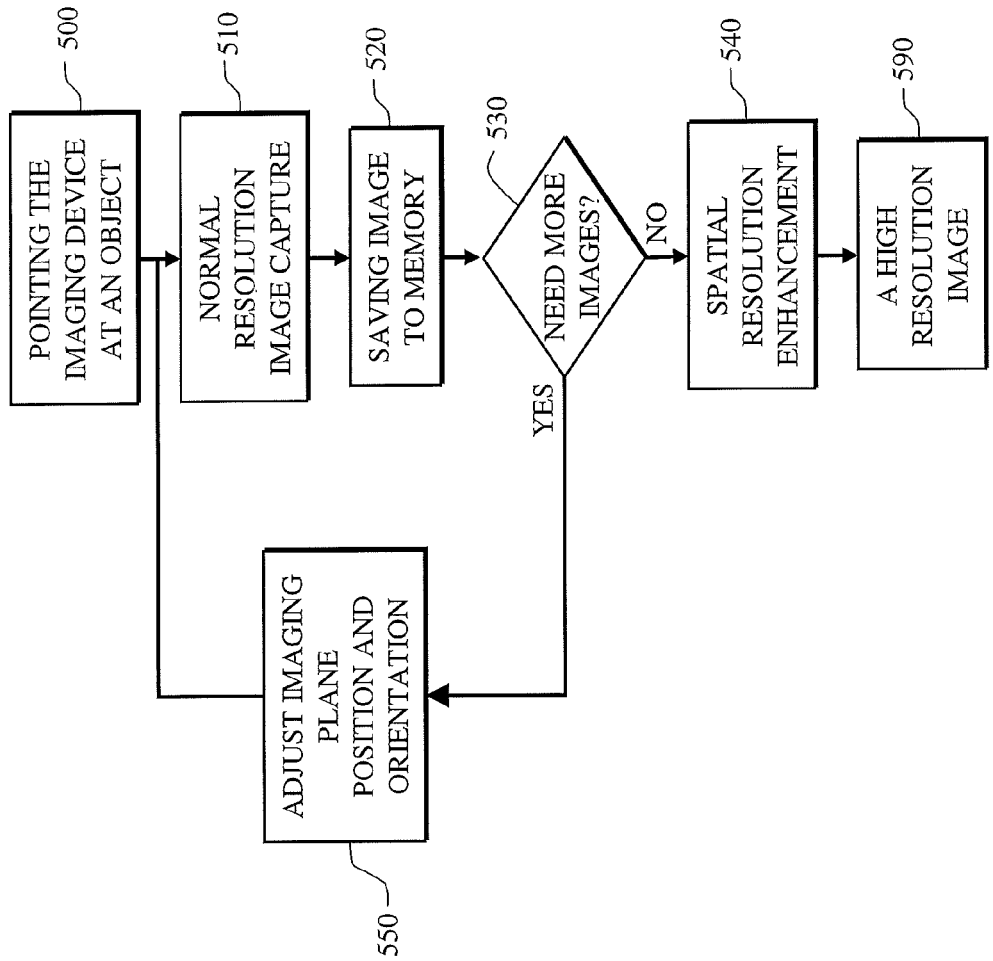
FIG. 4 is a flowchart illustrating a parallel mode of image capture and resolution enhancement.
Figure 5:
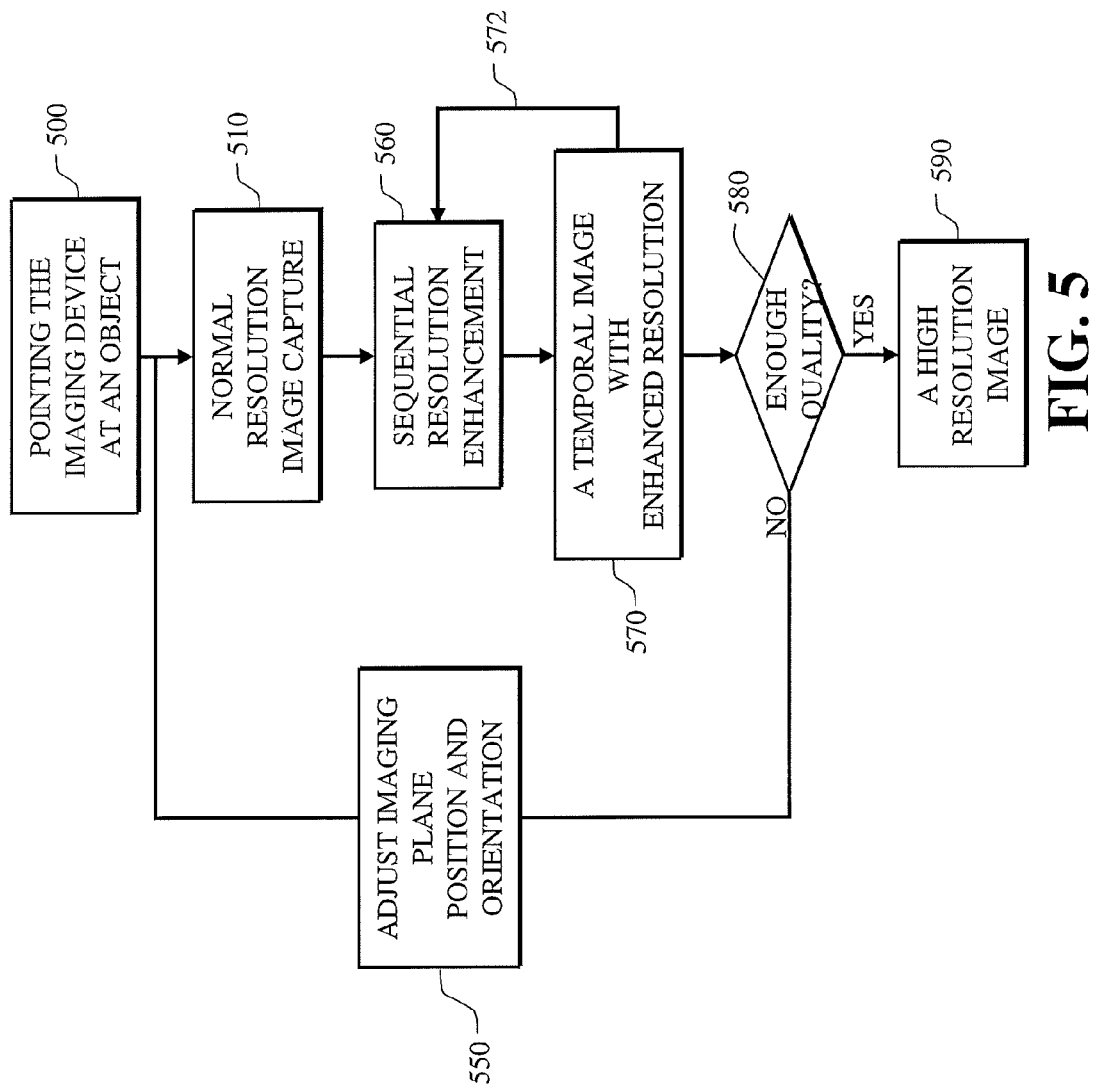
FIG. 5 is a flowchart illustrating a sequential mode of image capture and resolution enhancement.

The image capture procedure can be parallel or sequential, which will be presented in detail in FIG. 4 and FIG. 5.

FIG. 4 is a flowchart illustrating a parallel mode of image capture and resolution enhancement. In FIG. 4, normal resolution images are collected and used at the same time to recover the high-resolution image. First the imaging device 200 is pointed to the object 250 in step 500. An image is captured on imaging plane in step 510 and saved to memory in step 520. If more images are needed 530, the position and orientation of the imaging plane is adjusted in step 550, and the control goes back to step 510. Otherwise, all the normal resolution images are used simultaneously to enhance image resolution in step 540, yielding a high-resolution image in step 590 with higher spatial resolution than the sensor resolution.

FIG. 5 is a flowchart illustrating a sequential mode of image capture and resolution enhancement. In FIG. 5, a sequentially updated high-resolution image using new normal resolution observations is produced until a satisfactory image quality is achieved. First, the imaging device 200 is pointed to the object 250 in step 500. An image is captured on imaging plane in step 510. The newly captured normal resolution image 510 and a previously estimated high-resolution image 560 are integrated together to get an updated estimation of the high-resolution image, i.e., a temporal image with enhanced resolution 570. The temporal image 570 is subsequently looped back 572 for use in latter iterations when additional image quality is required. Accordingly, if the image quality is not high enough in decision step 580, the position and orientation of the imaging plane is adjusted in step 550, and the control goes back to step 510. Otherwise, the estimated high-resolution image 570 is delivered as the final high-resolution image 590.

Accordingly, the following compares the parallel mode of FIG. 4 and the sequential mode of FIG. 5. In FIG. 4 for example, N normal resolution images are input in step 540, which results in the generation of a high-resolution image. In contrast, in FIG. 5 for example, one normal resolution image 510 is combines with one temporary high-resolution image 560 resulting in a temporal image with enhanced resolution 570 that can be used as a high-resolution image 590.

Other ways to combine multiple normal resolution images to a single high-resolution image after registration include a non-uniform interpolation technique, a maximum a posteriori (MAP) optimization technique, a constrained least square regularization technique, a projection onto convex sets (POCS) technique, an iterative back-projection technique, and the like.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

200 Imaging device with adjustable image plane
210 Imaging plane
215 Image plane at a different location and orientation
220 Lens
230 Processor module
240 Memory module
245 Control unit
250 Object to be imaged
260 Image on image plane
270 X axis
280 Y axis
290 Z axis
300 Rotation around X axis
310 Rotation around Y axis
320 Rotation around Z axis
330 Translation along X axis
330 Translation along Y axis
400 Pixel location on high-resolution image plane
410 Pixel location on imaging plane 1
420 Pixel location on imaging plane 2 after alignment
430 Pixel location on imaging plane 3 after alignment
440 Pixel location on imaging plane 4 after alignment
500 Step of pointing the imaging device at an object
510 Normal resolution image capture step
520 Step of image saving
530 Decision of adding more images
540 Spatial resolution enhancement step
550 Step of adjusting image plane position and orientation
560 Step of sequential resolution enhancement
570 A temporal image with enhanced spatial resolution
572 Loop back
580 Decision of adding more images
590 A high-resolution image

What is claimed is:

1. An imaging apparatus with adjustable imaging plane, the apparatus comprising:
    a lens for focusing electromagnetic waves on an imaging plane;
    an array of sensors disposed on the imaging plane;
    a control unit for capturing a plurality of normal resolution images;
    a memory for storing the plurality of normal resolution images;
    a processor for performing computations on the normal resolution images;
    means for rotating the imaging plane along X, Y and Z axes; and
    means for integrating the plurality of normal resolution images for creating an image with higher resolution than the sensor resolution.

2. The apparatus of claim 1, wherein mechanical, electronic or optical means rotate the imaging plane freely around the X, Y and Z axes.

3. The apparatus of claim 1, wherein the control unit directs successive capture of a plurality of normal resolution images while adjusting the position and the orientation of the imaging plane.

4. The apparatus of claim 1, wherein the memory further stores computational codes that are available to integrate the captured images as a single image with higher spatial resolution and richer frequency content than the sensor resolution.

5. The apparatus of claim 1, wherein the electromagnetic waves are visible light or X-ray, and the imaging object resides in air, water, vacuum, or other media.

6. The apparatus of claim 1, wherein the sensors are from a group consisting of CCD array, CMOS array, and film.

7. A computational method of enhancing image spatial resolution and frequency content, the method comprising:
   deriving a correspondence between captured images based on a relative rotation of an imaging plane along X, Y and Z axes;
   warping all the normal resolution images to a common reference coordinate; and
   estimating a high-resolution image that yields projections on the imaging plane closest to normal resolution observations.

8. The method of claim 7, wherein estimating the high-resolution image further comprises using all normal resolution images at the same time in a batch mode.

9. The method of claim 7, wherein the estimating the high-resolution image further comprises combining a new captured image and the previously estimated high-resolution image in a sequential mode for generating a new high-resolution image.

10. The method of claim 7, wherein estimating the high-resolution image further comprises performing non-uniform interpolation.

11. The method of claim 7, wherein estimating the high-resolution image further comprises maximizing posteriori (MAP) optimization.

12. The method of claim 7, wherein estimating the high-resolution image further comprises performing a constrained least square regularization technique.

13. The method of claim 7, wherein the estimating the high-resolution image further comprises performing a projection onto convex sets (POCS) technique.

14. The method of claim 7, wherein estimating the high-resolution image further comprises performing an iterative back-projection technique.

15. An imaging apparatus for rotating an imaging plane, the apparatus comprising:
   an array of sensors forming the imaging plane;
   a lens for focusing electromagnetic waves on the imaging plane;
   a control unit for capturing a plurality of normal resolution images;
   a memory for storing the plurality of normal resolution images;
   a processor for performing computations on the normal resolution images;
   means for rotating the array of sensors along X, Y and Z axes so that the imaging plane is rotated along X, Y and Z axes; and
   means for integrating the plurality of normal resolution images for creating an image with higher resolution than the sensor resolution.

16. The apparatus of claim 15, wherein mechanical, electronic or optical means rotate the array of sensors so that the imaging plane rotates freely around the X, Y and Z axes.

17. The apparatus of claim 15, wherein the control unit directs successive capture of a plurality of normal resolution images while adjusting the position and the orientation of the imaging plane.

18. The apparatus of claim 15, wherein the memory further stores computational codes that are available to integrate the captured images as a single image with higher spatial resolution and richer frequency content than the sensor resolution.

19. The apparatus of claim 1, wherein the electromagnetic waves are visible light or X-ray, and the imaging object resides in air, water, vacuum, or other media.

20. The apparatus of claim 15, wherein the sensors are from a group consisting of CCD array and CMOS array.

* * * * *